July 1, 1924.

J. JOHNSON

DUMP CAR

Filed April 2, 1921

1,499,459

INVENTOR.
John Johnson
BY
ATTORNEY.

Patented July 1, 1924.

1,499,459

UNITED STATES PATENT OFFICE.

JOHN JOHNSON, OF IRON RIVER, MICHIGAN.

DUMP CAR.

Application filed April 2, 1921. Serial No. 458,169.

*To all whom it may concern:*

Be it known that I, JOHN JOHNSON, a citizen of Sweden, residing at Iron River, Iron County, Michigan, have invented certain new and useful Improvements in Dump Cars, of which the following is a specification.

The present improvement relates to dump wagons, dump cars, and the like and has particular reference to the heavier and less easily operable types of such, for instance ore cars, where the closing of the bottom drop doors involves an appreciable amount of labor when operated by hand.

The object of my invention is to relieve the ore car, mine car, or other form of dump car attendant of the labor of closing or lifting the heavy doors and to utilize the draft or propelling power for the car to close said doors. Another object is to effect said improvement in a simple manner and to make it applicable to existing forms of dump cars and the like, or to obviate special forms of cars or car-bodies, or hoppers.

With these general objects in view this invention consists in the novel construction, combination and arrangement of parts hereinafter described in detail, illustrated in the accompanying drawing, and more particularly pointed out in the appended claims.

In the drawing—

Figure 1:
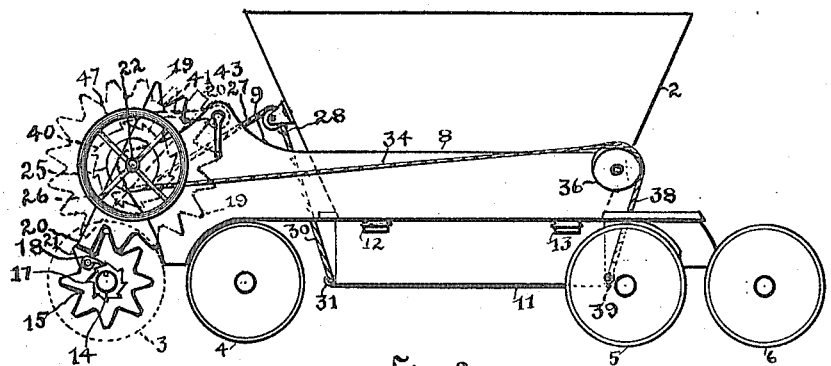
Figure 1 is a diagrammatic or skeleton view in elevation of a dump car with my improvement applied thereto, the front truck wheels being removed and their position shown by dotted lines.

In the several views 2 represents the body or hopper mounted as on wheels in any preferred way, the wheel supports in the present illustration of my invention consisting of four-wheel forward and rear trucks, the forward wheels being labeled 3 and 4 and the rear wheels 5 and 6. Said body or hopper 2 is shown supported by and secured to, in any suitable manner, a pair of long steel plates, or side planks 7 and 8 at the sides of the hopper and are rested in any preferred way on the wheels, axles, or trucks, the details of which are not involved in the present invention. The forward projections of the said side supports 7 and 8 are separately indicated by the numeral 9 as the shaft-bearing portions of the hopper support involved in this improvement for closing the bottom doors—10 and 11—of the hopper with the aid of a power mechanism. In Figure 1, 12 and 13 indicate hinges or pivot supports for one of the two identical doors, same being, as is well known, usually pivoted to the lower side edges of the hopper or receptable 2.

From the front axle 14 for the forward wheels 3 is transmitted the drop-door closing power, same acting automatically to close the doors after the contents of the car have been dumped and its movement away from the dump begins. In the several views the mechanism is shown arranged as at the beginning of such movement. In Figure 1 the dotted gear teeth to the left show the changed position of the segmental gear, or its position after the doors have been closed, or after the car has moved a sufficient distance to effect such closing. From the shaft or axle 14 the power is transmitted through a toothed wheel 15 which is loosely mounted on the axle and rotated therewith in only one direction by a pawl 18 and ratchet 17. Said wheel 15 is held against movement along the shaft or axle 14 by a collar 16 shrunk on or keyed to said shaft at one side of the wheel 15 and by a ratchet wheel 17 keyed to the axle at the opposite side of the wheel 15 and provided with the usual spring-pressed pawl 18.

Said wheel 15 is arranged to mesh with the teeth of a larger and segmental wheel 19 the periphery of which forms substantially a semi-circle, as it is shown partly in full lines and to the right in Figure 1. The straight edge of the wheel 19 terminates at one end in a lug or projection 20 which takes the place of the last tooth on the wheel at the opposite end of said straight edge. As shown the lug 20 is longer than one of the teeth and its purpose is to serve as a stop limiting the rotation in one direction of the wheel 19 by the wheel 15, by its end meeting and abutting against the tooth on the wheel 15 separately labeled 21, and by striking said tooth at its inclined side opposite to that which would operatively engage the teeth on the wheel 19, as plainly shown in said Figure 1.

Figure 2:
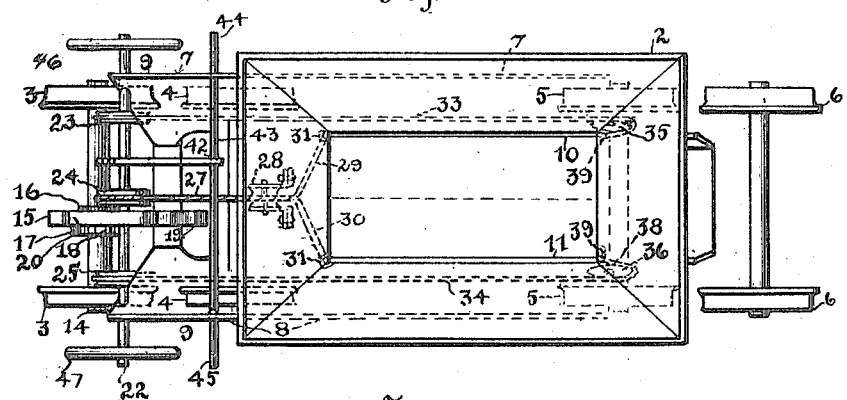
Figure 2 is a top plan view of same.
Figure 3:
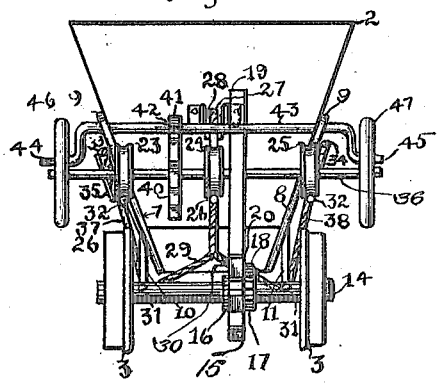
Figure 3 is an end view.

The wheel 19 is keyed to a shaft or rod 22 journaled or passing through the forward ends 9 of the side plates 7 and 8. To the same shaft or rod 22 are keyed three grooved wheels or pulleys 23, 24 and 25 on which are partly wound the hereinafter referred to ropes or cables that pull the drop doors to their closed positions. In the groove or channel of the pulley 24 is secured an end 26 of a rope or cable 27 which passes over a smaller pulley 28, suitably mounted on the forward end of the hopper 2, and thence extending downwardly into a pair of branches 29 and 30 respectively secured to eyes, or points of attachment, 31 on the forward corners of the doors 10 and 11. To the pulleys 23 and 25 are secured at 32, 32 the ends of ropes or cables 33 and 34 which pass rearwardly at the opposite sides of the hopper to and over pulleys 35 and 36 rotatably mounted on the opposite sides of the hopper and at its rear end as shown particularly in Figures 1 and 2. From the pulleys 35 and 36 the cables 33 and 34 extend to the lower (when the doors are open) rear corners of the drop doors where they are attached at 39 in the same manner as the branches 29 and 30 of the cable 27 is attached to the front lower corners of said doors. Rearwardly and downwardly from the rear pulleys extending runs of the cables 33 and 34 are separately labeled 37 and 38.

On the shaft 22 is also keyed a ratchet wheel 40 which is controlled or held against rotation in one direction, or in the direction opposite to that in which it is rotated by the gear wheels 15 and 19, by a pawl 41 that is keyed at 42 to a rod 43. The ends of the latter are bent to form cranks 44 and 45 by means of which the rod 43 may be turned by hand to lift the catch of the pawl 41 out of engagement with the ratchet wheel 40 and permit the doors 10 and 11 to drop or open under a superimposed load. To facilitate the release of the pawl the shaft 22 has keyed to its respective ends hand-wheels 46 and 47 by means of which the shaft 22 may be slightly turned in reverse direction to release the engagement of the pawl 41 with a tooth of the ratchet wheel 40 with which it may be engaged to hold the doors 10 and 11 in their closed positions.

In Figure 1 the dotted numeral 20 indicates the lug 20 shown in the reverse position, or the position, substantially, occupied by it when the doors are closed. The uppermost tooth of the open door position of the wheel 19 is arranged to be in a position slightly in advance of the position of the lug 20 shown in engagement with the tooth 21, when the doors are closed, or so as to clear the revolving teeth of the wheel 15. When the doors are opened by the weight of the load after release of the pawl 41 from the wheel 40, the wheel 19 will be rotated to engage its teeth with the teeth of the wheel 15 which will be rotated backwardly on the axle 14 until the lug 20 reaches its lower or stop position, or strikes the first tooth it meets on the wheel 15. The manual operation of the door closing mechanism provided for heavy ore cars always requires great exertion. In the present improvement this is eliminated and the only manual operation is that of a slight pull on a crank 44 or 45 with one hand and a slight turn of a wheel 46 or 47 with the other hand to release the grip of the pawl 41 in order to permit the load to drop from the hopper. The particular details shown may be carried out in numerous ways to accomplish the same results or substantially the same mechanism, the essential feature of which is automatic closing of the doors the moment a car begins to move away from the dumping place without any effort on the part of the attendant or operator.

I claim as my invention—

1. The combination with a dump car and the drop-door therefor, of a door-closing mechanism; means actuated by the wheels upon which the body of said car is mounted for actuating said mechanism and means rendering inoperative said door closing mechanism when the doors have reached their closed position.

2. The combination with a dump-car provided with a drop-door, of a mechanism operated by the wheels under the body of said car for swinging said door to its closed position by the movement of said car, and means automatically stopping the door-closing mechanism when the door has reached its closed position.

3. The combination with a dump-car having bottom drop doors, of a power-mechanism for returning said doors to their closed position after being opened, and means actuated by the wheels on which the body of said car is mounted for moving the car from one position to another for rendering said power-mechanism operative to close said doors, said means becoming automatically inoperative when said doors have reached their closed position.

In testimony whereof I have hereunto signed my name.

JOHN JOHNSON.